(12) United States Patent
Sinclair et al.

(10) Patent No.: US 8,396,862 B2
(45) Date of Patent: Mar. 12, 2013

(54) PRODUCT JOIN DYNAMIC PARTITION ELIMINATION FOR MULTILEVEL PARTITIONING

(75) Inventors: Paul Sinclair, Manhattan Beach, CA (US); Xiaorong Luo, Bellevue, WA (US); Mark Sirek, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 382 days.

(21) Appl. No.: 11/830,000

(22) Filed: Jul. 30, 2007

(65) Prior Publication Data

US 2009/0037365 A1 Feb. 5, 2009

(51) Int. Cl.
*G06F 7/00* (2006.01)
*G06F 17/30* (2006.01)

(52) U.S. Cl. ........................................ 707/714; 707/719

(58) Field of Classification Search .................. 707/716, 707/739, 972, 714, 718, 719
See application file for complete search history.

(56) References Cited

U.S. PATENT DOCUMENTS

| | | | |
|---|---|---|---|
| 5,345,585 A | 9/1994 | Iyer et al. | |
| 5,379,419 A | 1/1995 | Heffernan et al. | |
| 5,544,355 A | 8/1996 | Chaudhuri et al. | |
| 5,548,755 A | 8/1996 | Leung et al. | |
| 5,551,027 A | 8/1996 | Choy et al. | |
| 5,671,403 A | 9/1997 | Shekita et al. | |
| 5,734,884 A | 3/1998 | Eberhard et al. | |
| 5,758,144 A | 5/1998 | Eberhard et al. | |
| 5,903,893 A * | 5/1999 | Kleewein et al. | 707/714 |
| 6,092,062 A | 7/2000 | Lohman et al. | |
| 6,345,267 B1 | 2/2002 | Lohman et al. | |
| 6,484,161 B1 * | 11/2002 | Chipalkatti et al. | 707/3 |
| 6,609,131 B1 * | 8/2003 | Zait et al. | 707/102 |
| 6,772,163 B1 | 8/2004 | Sinclair et al. | |
| 6,845,375 B1 | 1/2005 | Sinclair | |
| 6,965,891 B1 | 11/2005 | Jakobsson et al. | |
| 7,130,838 B2 | 10/2006 | Barsness et al. | |
| 7,146,365 B2 | 12/2006 | Allen et al. | |
| 7,203,686 B1 * | 4/2007 | Sinclair et al. | 1/1 |
| 7,299,239 B1 * | 11/2007 | Basu et al. | 707/100 |
| 2003/0028509 A1 * | 2/2003 | Sah et al. | 707/1 |
| 2004/0260684 A1 * | 12/2004 | Agrawal et al. | 707/3 |
| 2005/0222978 A1 * | 10/2005 | Drory et al. | 707/3 |
| 2006/0218123 A1 * | 9/2006 | Chowdhuri et al. | 707/2 |
| 2007/0027860 A1 * | 2/2007 | Bestgen et al. | 707/5 |
| 2007/0156769 A1 * | 7/2007 | Sinclair | 707/200 |

OTHER PUBLICATIONS

Hoffer et al. "Modern Database Management" 2004, Prentice Hall, 7th edition, pp. 311-313.*
Butcher, T. "Sams Teach yourself MySQL in 21 Days" [online]. 2nd Edition. Sams Dec. 17, 2002 [retrieved on Oct. 23, 2010]. Retrieved from the Internet:< URL: http://proquest.safaribooksonline.com/0-672-32392-3> pp. 110-124.*

(Continued)

*Primary Examiner* — James E Richardson
(74) *Attorney, Agent, or Firm* — Schwegman, Lundberg & Woessner

(57) ABSTRACT

A method of searching a multilevel partitioned database includes receiving a query data from the multilevel partitioned database. At least for one level partitions are dynamically included. For some levels, partitions may also be statically included for execution of the query. The query is the executed over the partitions that are both dynamically and statically included. In one example, the cost of joining two tables in a multilevel partitioned database includes determining level partitions that can be statically included, estimating level partitions that will be dynamically considered for the join, and determining a cost as a function of the estimated statically included level partitions and estimated dynamically included level partitions.

12 Claims, 4 Drawing Sheets

OTHER PUBLICATIONS

Tow, D. "SQL Tuning" [online] O'Reilly Media, Inc. Nov. 19, 2003 [retrieved on Oct. 23, 2010]. Retrieved from the Internet:< URL:http://proquest.safaribooksonline.com/0-596-00573-3> 21 Selected Pages.*

Butcher, T. "Sams Teach yourself MySQL in 21 Days", 2nd ed. Sams Dec. 17, 2002, pp. 110-124, http://proquest,safaribooksonline,com/ 0-672-32392-3, (2003), 18 pgs.

* cited by examiner

FIG. 2

| | | |
|---|---|---|
| JANUARY 2004 | 01 | ALABAMA |
| JANUARY 2004 | 02 | ALASKA |
| JANUARY 2004 | 03 | ARIZONA |
| JANUARY 2004 | 04 | ARKANSAS |
| JANUARY 2004 | 05 | CALIFORNIA |
| ⋮ | | |
| MARCH 2006 | 05 | CALIFORNIA |
| MARCH 2006 | 06 | COLORADO |
| ⋮ | | |
| MAY 2007 | 04 | ARKANSAS |
| MAY 2007 | 05 | CALIFORNIA |
| MAY 2007 | 06 | COLORADO |

310 — FOR EACH AMP, FIND PARTITION CORRESPONDING TO QUERY VALUE

↓

315 — SCAN ROWS IN PARTITION

↓

320 — STOP SCANNING WHEN VALUE OF ROW INDICATES A PARTITION DIFFERENT THAN THE PARTITION CORRESPONDING TO QUERY VALUE

PRODUCT JOIN DYNAMIC PARTITION ELIMINATION FOR MULTILEVEL PARTITIONING

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. In some situations, particular portions of the data in a table are searched more often than other portions. If the data is properly organized, performance can be improved by searching a part of the data for queries that can take advantage of that organization. If the data is not organized in any way, it will often need to be searched in its entirety to satisfy a query or copied and restructured into a useful organization.

In some cases, it is possible to eliminate large portions of a database prior to executing a query. For instance, an insurance database may cover many years or months. Perhaps the query is directed toward a certain number of months in a year. A table may be created that is partitioned by month for each year. Thus, all the rows in the table may be partitioned by month, and a partitioned primary index points to a first row for each month. It is then possible to quickly identify a starting partition, and eliminate partitions for prior months and future months from consideration. Then, the query may be run over the remaining partitions in the table. This is referred to as a single-level partitioned table with static elimination of partitions that are not needed for a query.

Difficulty arises when a further partitioning of the database may be helpful, such as, in addition to partitioning the database by year and month, a query may only be interested in results from one geographic region, such as a state or states for selected months. This type of partitioning is referred to as multilevel partitioning. While some static partition elimination may occur on a month basis, there is a need to further improve query performance over such multilevel partitioned data, in particular, when the partitions to eliminate cannot be determined statically but require retrieval of information from other tables.

BRIEF DESCRIPTION OF THE DRAWINGS

FIG. 2 is a representation of multilevel partitions according to an example embodiment.

FIG. 3 is a flowchart representation of searching a multilevel partitioned database according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A database system for complex queries over a multilevel partitioned database utilizes static and dynamic partition elimination to reduce the amount of data needed to be processed for the queries. In one embodiment, each partition at a level may be subpartitioned. An example database architecture is shown, followed by a simplified database illustrating multilevel portioning and the elimination from or inclusion of multilevel partitions for selected example queries.

Figure 1:
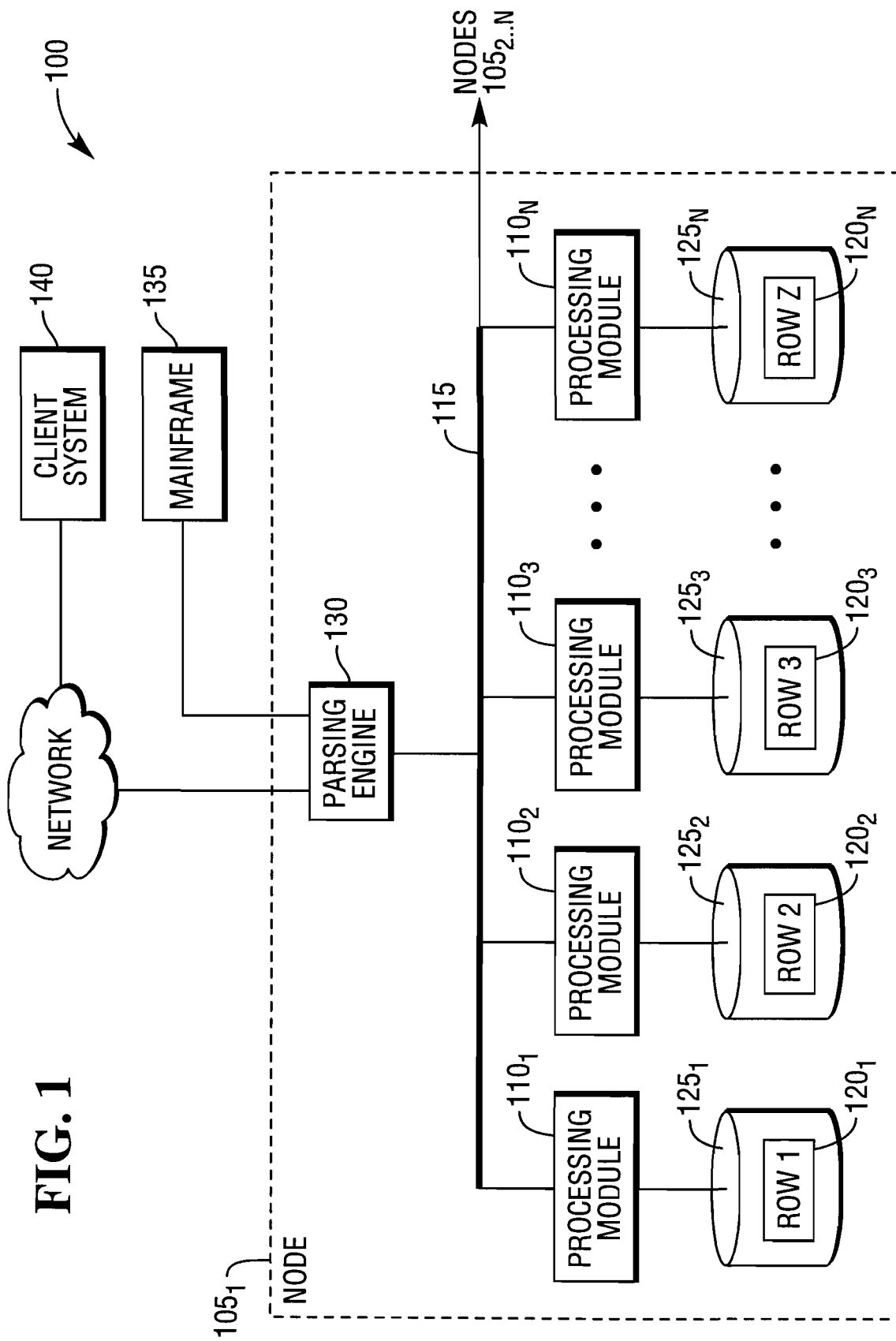
FIG. 1 is a block diagram of a node of a database system having data stored in multilevel partitions according to an example embodiment.

The database system has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ or AMP (access module processor) of the DBS 100. The DBS node $105_1$ may include one or more processing modules $110_{1 \ldots N}$, connected by a network 115, that manage the storage and retrieval of data in data-storage facilities $125_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor may swap between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $125_{1 \ldots N}$. Each of the data-storage facilities $125_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $125_{1 \ldots N}$. In one embodiment, the rows $120_{1 \ldots N}$ of the tables are stored across multiple data-storage facilities $125_{1 \ldots N}$ to ensure that the system workload is distributed evenly across the processing modules $110_{1 \ldots N}$. A parsing engine 130 organizes the storage of data and the distribution of table rows $120_{1 \ldots N}$ among the processing modules $110_{1 \ldots N}$. The parsing engine 130 also coordinates the retrieval of data from the data-storage facilities $125_{1 \ldots N}$ in response to queries received from a user at a mainframe 135 or a client computer 140. The DBS 100 usually receives queries and commands to build tables in a standard format, such as SQL.

The rows $120_{1 \ldots N}$ are distributed across the data-storage facilities $125_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated as a hash bucket. The hash buckets are assigned to data-storage facilities $125_{1 \ldots N}$ and associated processing modules $110_{1 \ldots N}$ by a hash bucket map. The characteristics of the columns chosen for the primary index determine how evenly the rows are distributed.

In one embodiment, two columns may be designated as partitioning columns and rows are stored within a data-storage faclitiy in a partitioned primary index table as represented in block diagram form at 200 in FIG. 2. For each of the two columns, a partitioning expression is specified by the user. Each partitioning expression is then applied to the contents of the corresponding partitioning column for each row such that the partitions are at least logically stored in an order that is a function of the contents of the columns.

In one example embodiment, a first set of partitions 210 may be based on a month value in a column, and a second set of partitions 215 may be based on a value for a state, such as California. One example partition is illustrated for January 2005 and the state of California at 220. For each year, there are 12 months, and up to 50 states, resulting in 12×50=600 partitions. Each partition may contain many records or rows, each having the column values that identify their partition. The partitioned primary index table 200 identifies the start of each partition. In one embodiment, the columns contain numerical representations as opposed to alphanumeric values. In such cases, a translation may need to occur. The states may have associated two digit values, perhaps in an order corresponding to the name of the state. California in such an embodiment would have the number "05" as it is the fifth state. In further embodiments, the number associated with the state may be larger, and may have any values desired.

Queries involving the values of columns in the partitioned primary index can be efficiently executed at 300 because the processing module $110_n$ having access to the data storage facility $120_n$ that contains the first row of a partition can be immediately determined at 310 as illustrated in FIG. 3. The partition may then be scanned at 315 for rows corresponding to the query. The partitioning allows many of the rows in a table to be eliminated without the need to scan them. When looking for a particular month, the partitioned primary index points to the first partition containing the month. Scanning rows starts at that partition and may conclude at 320 when the first different month is encountered. If multiple months are scanned in order satisfy the query, the first month that does not match the query stops the scanning. The query may be executed on each AMP. The term query may also involve the use of other database operations, such as joins to execute the query more efficiently.

Figure 4:
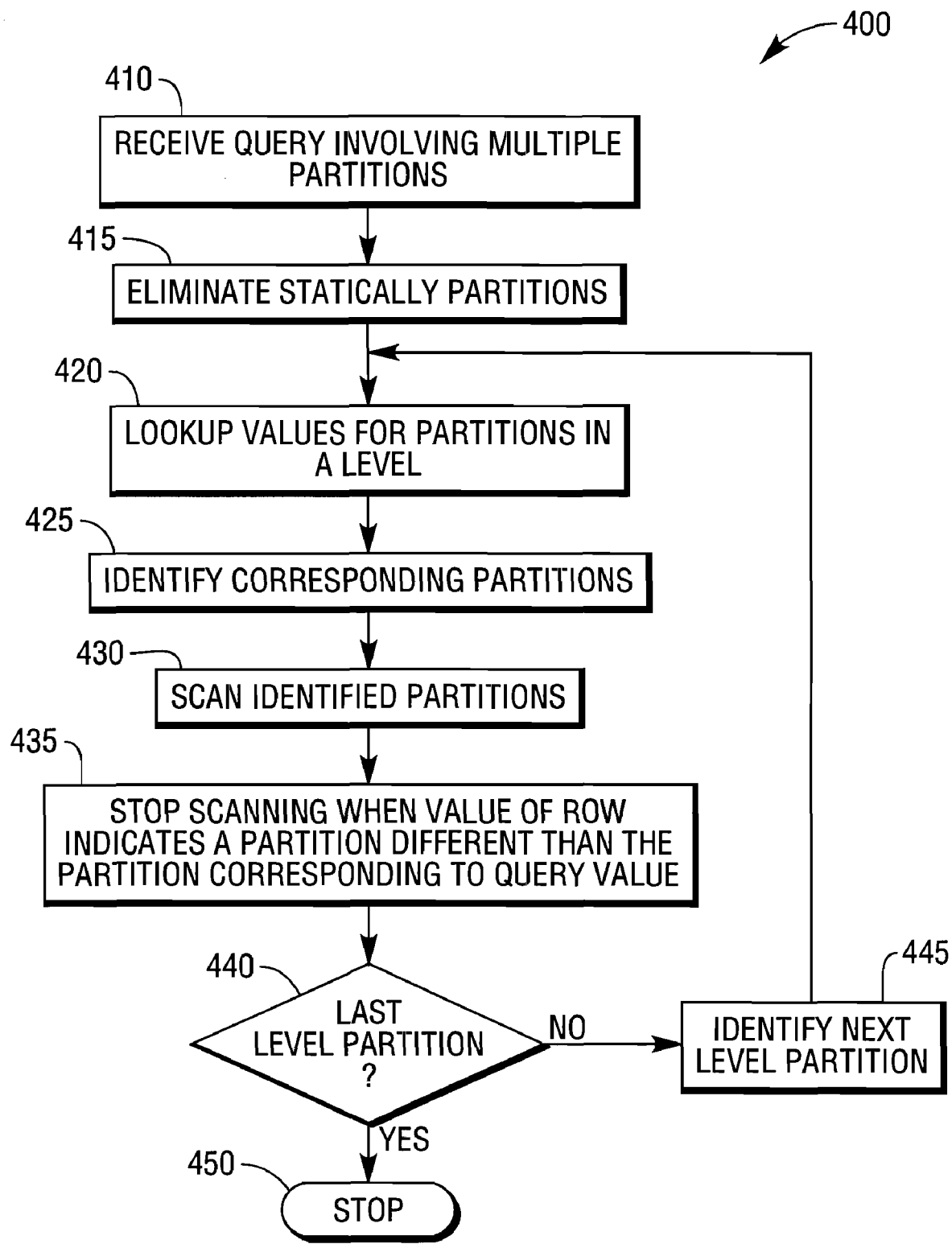
FIG. 4 is a flowchart representation of elimination of partitions while searching a multilevel partitioned database according to an example embodiment.

For a query that involves two columns, both of which form the basis for partitioning, it may be desirable to perform several operations to efficiently obtain results for the query is illustrated at 400 in FIG. 4. As an example, suppose a user wanted to find sales for the month of March 2006 for California. The query is received at 410 and by use of the first partition by month partitions preceding March 2006 may be statically eliminated at 415. Static partition elimination may be performed without beginning to actually execute the query. Partitions may be statically eliminated by scanning the partitioned primary index to identify the start of rows for March 2006.

To further eliminate rows for March 2006, a lookup may be done at 420 to identify the numerical value for California. This allows identification of the beginning of rows in March 2006 that also reference California at 425. This method of including or excluding rows is referred to as dynamic elimination. These rows may then be scanned at 430 to see which rows satisfy the query. As soon as the rows indicate a different state, the scanning may be stopped at 435. If the query included more than one month at 440, the process may repeat for the next month 445, first identifying the partition with the month and state, and then scanning rows until a new state outside the query is found. If the query related to more than one state, the partitions for March 2006 that include data for the more than one state may then be scanned. Once the last first level partition is processed, execution of the query may stop at 450.

In further embodiments, more than two levels of partitions may be utilized. In one embodiment, there is an inherent limit of about $2^{16}$ partitions, but that number may be larger in further embodiments.

In one example query, partitions may exist for each month on a first day to last day of the month. The query may be for a fiscal month, which may not coincide with the partition. Perhaps fiscal August refers to July 28 through August 30. Thus, some rows in July and some in August would satisfy the query for fiscal August. A lookup table is first used to determine how fiscal August relates to the partitions. Thus, it is known that at least one July partition needs to be scanned, as well as an August partition. A plan is generated on each AMP to identify the partitions and scan them for rows satisfying the query. This may be viewed as determining which partitions to include, or as the exclusion of partitions.

When the query maps directly to the first level of partitions, such as calendar months, partitions may be statically excluded prior to beginning processing of the query. In the last example, the fiscal month does not map directly to the calendar month corresponding to the first level of partitioning. This resulted in a dynamic exclusion of partitions, in that first, the corresponding first level partitions corresponding to the fiscal month had to be looked up, and further, the state partitions then had to be added to an inclusion list of partitions that are needed for successful execution of the query.

In further query examples, some partition levels may resort to tables for exclusion and inclusion, while other levels may need to be entirely scanned to properly execute a query. For example, a July-September/California query may result in a static exclusion of month partitions other than July, August, and September coupled with a dynamic inclusion of partitions that include California.

Further detail regarding product join dynamic partition elimination for multilevel partitioning is now provided. Multilevel partitioning is partitioning applied at more than one level. For a product join, the relation (i.e., spool) that is sorted to join with the multilevel partitioned table may be sorted on the partition numbers (these are combined into a single internal partition number in the rowkey of each row in the spool) for the partitioning expressions to which the optimization is applicable.

A query optimizer sets the spool to have the same partitioning as the PPI (primary partition index) table except that its combined partitioning expression will have a constant 1 of INTEGER type for a level not participating in the dynamic partition elimination (that is, there is not an equality condition between the partitioning column of the PPI table and a column of the spool at that level). Additionally, at levels participating in the dynamic partition elimination, the partitioning column at such a level must be renamed to be the column in the spool. The PPI and PPI level descriptors are set the same as for the PPI table but with no mapping (internal partition number is the same as the external combined partition number) and the partition expression kind set to node for nonparticipating levels. Setting the spool up this way makes it easy to generate a dynamic inclusion list for the PPI table corresponding to a combined partition in the spool and also indicates to the join step which levels have dynamic partition elimination.

Note that the spool may be generated from multiple tables that are joined together to get the values corresponding to the multilevels of the PPI table before joining with the PPI table. Compromise joins and large-table/small tables join optimizations may plan the join this based on the equality constraint between the tables.

For multilevel partitioning, there may be multiple combined partitions to product join against the cache instead of just one so the scanning of the PPI table (and the costing) needs to take this into account.

Note that, currently, product join DPE uses the number of nonempty partitions in the costing. Basically, the reduction in product join cost is computed based on the number of nonempty partitions. The number of nonempty partitions is derived from PARTITION statistics if available. Otherwise, the number of unique values divided by the average values per partition is used as an upper bound on the number of nonempty partitions. With multilevel partitioning since there are usually multiple partitioning columns, the derivation of the number of nonempty partitions would be more complex in the absence of PARTITION statistics; instead, a conservative default number for nonempty partitions can be used to prevent being too aggressive on product join dynamic partition elimination. The user can always collect PARTITION statistics to make dynamic partition elimination more desirable. In one embodiment, it is recommended that statistics should be collected for use in dynamic partition elimination.

When executing the product join step in an AMP, dynamic partition elimination deals with one or more levels and handles them appropriately in conjunction with the static partition elimination list. Rows with equal sort values (that is, in the same internal partition number) from the spool may be brought into cache or until full as for single-level partitioning except that for multilevel partitioning, this is an external combined partition number for the sort value (with non-dynamic partition elimination levels set to be partition 1 for that level). For this set of rows, compute a list of external partition numbers by iterating through all the non-dynamic partition elimination levels in increments of the numsubparts value for those levels. Non-dynamic partition elimination levels are indicated in the level descriptor of the spool with a value of nodpe for ppiexprkind.

An external to internal mapping routine may be used to convert these external partition numbers to internal partition numbers for the PPI table. The parameters for this routine are the external combined partition number and a pointer to the PPI descriptor. In one embodiment, each AMP uses the same version routine to ensure consistency. The routine returns the corresponding internal partition number (that is, a value between 1 and 65535), or an internal error indication of "0" if the arguments are invalid. A partition inclusion list of non-eliminated partitions is generated from all internal partition numbers calculated in all non-dynamic partition elimination level iterations. If there is an inclusion list from static partition elimination, the new inclusion list is updated to only include partitions that are in also in the inclusion list for static partition elimination. The updated inclusion list is used to read the PPI table (using Sutstr) when doing the product join with the rows in the cache. The cache is then flushed and the above is repeated for the next set of rows with the same external combined partition number. If this next set of rows has the same partition number as the previous set (that is, not all rows with the same value fit in cache), the inclusion list is reused instead of being rebuilt. Also, to optimize, one row is read from the spool, the inclusion is built, and if the inclusion list is empty, the next partition in spool is used instead of filling up the cache first.

Cost

A common part of executing queries involves the joining of two tables. Optimizers generally determine the most efficient way to go about satisfying the query, perhaps by exploring the joining of different tables or different ways of joining tables. The costs of joining tables may be dependent on the amount of data that needs to be read from secondary storage, such as disk storage, which can involve latency and seek times. These may be referred to as I/O time. CPU time and other costs may also be taken into account.

If the number of rows involved in a join can be identified, it may dictate that a full product join be done if there are just a few rows. With multilevel partitioned data, it is straightforward to determine rows that can be statically eliminated, but as seen above, many more rows may be dynamically eliminated. It is difficult to determine those rows without actually beginning to execute the query. This makes the task of the optimizer in identifying the most efficient plan very difficult.

In one embodiment, an estimation of the number of rows involved in a join may be provided as a function of statistics identifying the number of partitions and the number of rows in each partitions. Heuristic assumptions or a best guess may be used in some embodiments where statistics are lacking.

For dynamic partition elimination (DPE), the relation joined to a partitioned table is duplicated on all AMPS and then a portion of the relation may be brought into cache and directly joined to the partitioned table. This is repeated until all the rows of the relation have been joined. In the join step, the relation can be considered to be the left table or the right table with the partitioned table being the right table or left table, respectively. The following describes a method to cost the join step if the relation is the left table (if it is the right table, switch left and right in the following).

Figure 5:
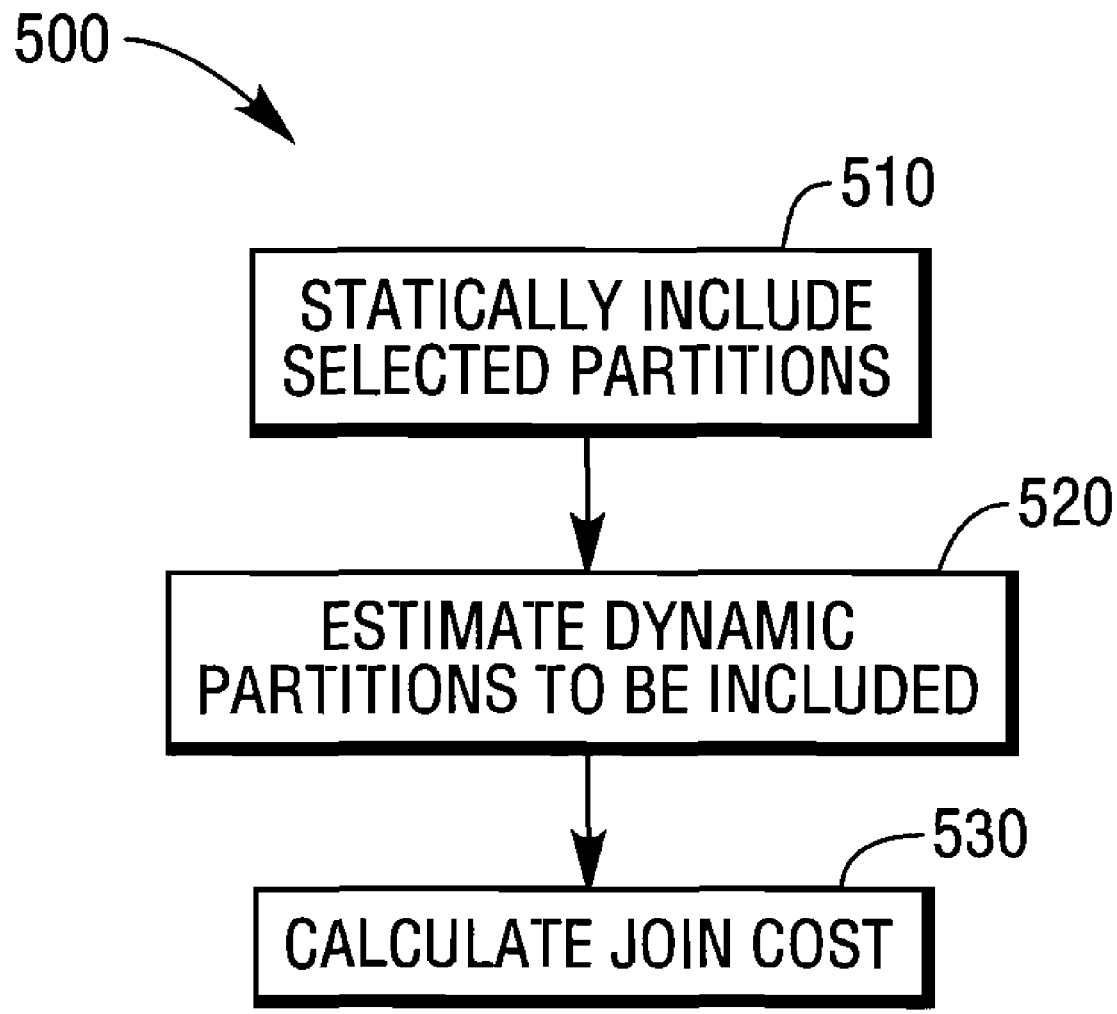
FIG. 5 is a flowchart representation of estimating a join cost for a multilevel partitioned database according to an example embodiment.

In one embodiment, two tables are joined in a multilevel partitioned database as illustrated in FIG. 5 at 500. Method 500 includes determining partitions from various levels that can be statically included at 510. At 520, partitions at various levels that will be dynamically considered for the join are estimated. At 530, a join cost is determined as a function of the determined static partitions included and estimated dynamically included partitions.

Left Duplicate & Right Direct MLPPI PJ DPE Costing:

Assume there are NonEmptyPartNum partitions in the right relation. For a regular product join, rows in each left cache are joined with all the rows in all NonEmptyPartNum partitions in the right relation. With dynamic partition elimination, rows in each left partition only need to join with rows in X partitions in the right, where X is the product of the number of active partitions in all non-participating levels. Rows in the left spool are partitioned based on join columns.

When there is static partition elimination (SPE) in one such level, the number of active partitions for this level is determined from the SPE results; otherwise, the total number of partitions defined in this level is the number of active partitions. When there are no NoDPE levels (that is, there is at least one join condition for each partitioning column), X is 1 because each left cache joins to one right partition. So for product join (PJ) DPE, the cost reduction is between the following minimum and maximum amounts:

$$X/\text{minimum}(\text{maximum}(X, \text{NonEmptyPartNum}), \text{maximum}(X, \text{TotalActivePartNum}))$$

To avoid underestimating DPE, it is helpful if statistics have been collected on the system-derived column PARTITION (which has the value indicating the partition number of a row; the statistics on this column represent the number of rows per partition). NonEmptyPartNum is an estimate for the number of combined nonempty partitions. It is calculated based on collected statistics on the system-derived column PARTITION, if available. When there are no statistics on the system-derived column PARTITION, NonEmptyPartNum may be calculated based on collected multicolumn statistics or index statistics on just the set of partitioning columns. If there are no usable collected statistics but there is a nonunique secondary index (NUSI) on just the set of partitioning columns, a random AMP sample for the NUSI may be used to calculate NonEmptyPartNum. Otherwise, the default for NonEmptyPartNum is 0. When NonEmptyPartNum is zero, DPE PJ is not used. The multilevel partitioned primary index (MLPPI) PJ DPE cost is calculated as follows:

```
DPECost = left PPI spool preparation cost + DPE join cost
        = left->PrepCost + DPEJoinCost
where:
left->PrepCost = left PPI spool preparation cost including spooling and sorting
DPEJoinCost = left relation reading cost + right relation reading cost +
              right partitions preparation cost + actual join cost
            = left->RelCost + right->RelCost * Reduction * NumCache +
              PreProOverhead * NumCache +
              left->RelCard * Right->RelCard * RowComCost * Reduction
RowComCost = row comparing cost
           = Virtual Amps per CPU * Row comparing overhead
           = VampsPerCPU * vhdOfRowCompCost
Actual join cost = left->RelCard*Right->RelCard* RowComCost* Reduction
   (Note: for regular product join, all left qualified rows must be compared to join
    with all the qualified right rows, the cost is left->RelCard * Right->RelCard *
    RowComCost. For MLPPI DPE PJ, this is reduced by Reduction because each
    left value only needs to join with Right->RelCard * Reduction of right rows.)
left->RelCost = left relation reading cost
   (Note: the left relation only needs to be read one time, so the total left read cost
    is left->RelCost)
right->RelCost = right relation reading cost
   (Note: for regular PJ, for each left cache, the right relation is read once, the total
    is right->RelCost * NumCache; for MLPPI DPE PJ, for each left cache, only a
    subset of the partitions in the right is read, so the total is right->RelCost *
    NumCache * Reduction.)
Reduction = DPE reduction (based on elimination).compared to product join (PJ)
          = X / minimum(maximum(X, NonEmptyPartNum),
            maximum(X, TotalActivePartNum))
TotalActivePartNum = Total partition number after PE on the PPI table
X = number of partitions to which a cache needs to join
  = the product of the number of active partitions in all nonparticipating levels
  = maximum(product(Mi) for all NoDPE level i, 1)
Mi = the number of active partitions from static partition elimination on level i
     based on level i related conditions. The default is (Ni) the number of partitions
     defined in level i.
NonEmptyPartNum = number of nonempty combined partitions in the PPI table
NumCache = estimate of the number of times cache needs to be loaded to go
           through all the left rows - number of rows read from left table into
           cache.
         = the adjusted unique values of qualified rows from the left relation to do
           the join
         = minimum(left->RelCard, left->Values *
           minimum(1, (left->RowsPValue / RowsPerCache)))
          (Note: when the qualified rows per value from the left relation can not be
           loaded once into the available product join cache segments, they need to join to
           X partitions in the right for left->RowsPValue / RowsPerCache times.)
```

-continued

```
RowsPerCache    = rows allowed by all the product join cache segments
                = maximum number of product join cache segments allowed *
                  rows per segment
                = AWTPRJOINNUMSEGS * RowsPerSegment
RowsPerSegment  = rows per segment
                = maximum size of a product join cache segment / left row size
                = SYSMAXBUFFER / left->RowSize
PreProOverhead is the sum of the following two costs:
1) Product(Ni) * CPUScale * VampsPerCPU for all NoDPE level i
        This is the cost to compute a list of external partition numbers by
        iterating through all the non-DPE levels in increments of the
        numsubparts value for those levels. (For each cache, we need to find the
        related partitions to join.)
2) Product(Ni) * Number of pairs in Inclusion List * CPUScale *
   VampsPerCPU / 2 for all NoDPE level i
        This is the cost to convert these external partition numbers to internal
        partition numbers and merge them with static partition elimination (SPE)
        results. (Note: This assumes for each merge it needs to go though, on
        average, half of the inclusion list. The inclusion list is an arity2 list
        consisting of partition pairs generated by static partition elimination.)
PreProOverhead =
        (1 + Number of pairs in Inclusion List / 2) * Product(Ni) * CPUScale *
        VampsPerCPU
```

This new method allows an efficient product join using dynamic partition elimination occurring at one or more levels of a table with a multilevel partitioned primary index. This kind of query that looks up rows in one table and values from a row to determine the partitions in a fact table the row is to join with is common in applications. In addition, a reasonably accurate costing of this method that is fairly easy to calculate provides the optimizing the ability to pick this method when appropriate.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of searching a multilevel partitioned database, the method comprising:
   receiving a query for data from the multilevel partitioned database, wherein the multilevel partitioned database includes multiple rows of partitioned data that are partitioned into plurality of levels, wherein each level is partitioned based on a different column;
   statically including partitions from one or more first levels of the plurality of levels of the multilevel partitioned database for execution of the query;
   determining an estimate of partitions from at least a second level in the one or more first level partitions to be dynamically included;
   dynamically including at least some of the estimated partitions;
   joining at least two tables of the multilevel partitioned database based on a cost of joining the tables, the cost calculated as a function of the statically included partitions and the estimate of the partitions to be dynamically included;
   executing the query over the statically included partitions and the dynamically included partitions by;
      accessing at least one data storage facility;
      performing the joining of the at least two tables;
      scanning sorted rows of the at least some of the statically included partitions and dynamically included partitions; and
      stopping execution of the query when a row from a dynamically included partition indicates a partition that no longer matches a query value, wherein dynamically including partitions occurs while scanning rows of the statically included partitions during execution of the query.

2. The method of claim 1 wherein dynamically including at least some of the partitions comprises converting a query value to a converted query value.

3. The method of claim 2 wherein the converted query value is used to index into a partition.

4. The method of claim 3 wherein rows are retrieved from the partition until the converted query value no longer matches information in a row.

5. The method of claim 4 and further comprising repeating retrieval of rows from partitions at one or more levels.

6. The method of claim 1 wherein the multilevel partitioned database is distributed over multiple access module processors and wherein the method is performed on each such access module processor.

7. A database system having multiple level partitioned data, the system comprising:
   a storage device and a computer processor;
   a parsing engine including code stored on the storage device and running on the computer processor that receives a query for data from the multilevel partitioned database that includes multiple rows of partitioned data that are partitioned into a plurality of levels, wherein each level is partitioned based on a different column, statically includes partitions from one or more first levels of the plurality of levels of the multilevel partitioned database for execution of the query, determines an estimate of partitions from at least a second level in the one or more first level partitions to be dynamically included, dynamically includes at least some of the estimated partitions, joins at least two tables of the multilevel partitioned database based on a cost of joining the tables, the cost calculated as a function of the statically included partitions and the estimate of partitions to be dynamically included, and executes the query over the statically included partitions and the dynamically included partitions by, accessing at least one data storage facility, performing the joining of the at least two tables, scanning sorted rows of the at least some of the statically included partitions and dynamically included partitions, and stops execution of the query when a row from a dynamically included partition indicates a partition that no longer matches a query value, wherein the dynamically including partitions occurs while scanning rows of the statically included partitions during execution of the query.

8. The system of claim 7 wherein dynamically including at least some of the partitions comprises converting a query value to a converted query value for partitions.

9. The system of claim 8 wherein the converted query value is used to index into a partition.

10. The system of claim 9 wherein rows are retrieved from a partition until the converted query value no longer matches information in a row.

11. The system of claim 10 wherein the parsing engine repeats retrieval of rows from various level partitions.

12. The system of claim 7 and further comprising multiple access module processors having database data distributed on multiple storage devices within the access module processors.

* * * * *